(12) United States Patent
Goller et al.

(10) Patent No.: US 8,349,231 B2
(45) Date of Patent: Jan. 8, 2013

(54) SHAPED COMPOSITE MATERIAL

(75) Inventors: Ralf Siegfried Goller, Bergamo (IT); Marco Orlandi, Seregno (IT); Riccardo Piavani, Bariano (IT)

(73) Assignee: Brembo Ceramic Brake Systems S.p.A., Stezzano, Bergamo (IT)

( * ) Notice: Subject to any disclaimer, the term of this patent is extended or adjusted under 35 U.S.C. 154(b) by 1071 days.

(21) Appl. No.: 11/722,824

(22) PCT Filed: Dec. 30, 2004

(86) PCT No.: PCT/IT2004/000741
§ 371 (c)(1),
(2), (4) Date: Jul. 12, 2007

(87) PCT Pub. No.: WO2006/070418
PCT Pub. Date: Jul. 6, 2006

(65) Prior Publication Data
US 2007/0284772 A1    Dec. 13, 2007

(51) Int. Cl.
*C01B 31/00* (2006.01)
*B60T 1/06* (2006.01)
*B32B 9/00* (2006.01)

(52) U.S. Cl. ............ 264/29.7; 264/29.1; 264/29.2; 264/29.6; 264/101; 264/102; 264/241; 264/319; 188/18 A; 501/88; 501/90; 428/408

(58) Field of Classification Search ......... 264/29.7, 264/29.1, 29.2, 29.6, 101, 102, 241, 319; 188/18 A; 501/88, 90; 428/408
See application file for complete search history.

(56) References Cited

U.S. PATENT DOCUMENTS

| | | | | |
|---|---|---|---|---|
| H420 H | * | 2/1988 | Yeager et al. | 264/29.5 |
| 5,962,135 A | * | 10/1999 | Walker et al. | 428/408 |
| 6,231,791 B1 | * | 5/2001 | Heine et al. | 264/29.5 |
| 6,309,743 B1 | * | 10/2001 | Fujita | 428/317.9 |
| 6,802,403 B2 | * | 10/2004 | Goller et al. | 188/251 M |
| 6,878,331 B2 | * | 4/2005 | Huang et al. | 264/434 |
| 7,172,723 B2 | * | 2/2007 | Goller et al. | 264/640 |
| 7,700,181 B2 | * | 4/2010 | Goller et al. | 428/293.4 |
| 2002/0037992 A1 | * | 3/2002 | Niwa et al. | 528/189 |

FOREIGN PATENT DOCUMENTS

| | | |
|---|---|---|
| EP | 1124071 | 8/2001 |
| EP | 1124074 | 8/2001 |
| JP | 63060173 A * | 3/1988 |
| JP | 04153291 A * | 5/1992 |
| WO | 03/056206 | 7/2003 |
| WO | WO 03056206 A1 * | 7/2003 |

* cited by examiner

*Primary Examiner* — Christina Johnson
*Assistant Examiner* — Atul P. Khare
(74) *Attorney, Agent, or Firm* — Shoemaker and Mattare

(57) ABSTRACT

This invention relates to a process for the production of a shaped composite material and the material obtained through that process. In particular it relates to a process for obtaining a disk of composite ceramic material for disc brakes in which the friction coefficient is varied by varying the composition of the surface layer.

19 Claims, No Drawings

SHAPED COMPOSITE MATERIAL

FIELD OF THE INVENTION

In its more general aspect this invention relates to a process for producing a shaped composite material, and material which can be obtained using the said process, particularly for braking systems.

BACKGROUND ART

The use of composite ceramic materials in applications which require resistance to impact, compression and heat generated by friction is known in the art. These characteristics cannot in fact be ensured by pure ceramic materials because of their intrinsic brittleness.

A useful application is that in braking equipment, in particular for the preparation of disks for disc brakes.

These composite ceramic materials comprise a mixture of materials comprising bundles of filaments essentially consisting of carbon, aggregating resin, pitch and other additives and are produced in accordance with the known art in the following way: the bundles of filaments are mixed with an aggregating resin, pitch and other additives and the mixture is placed in a mould where it is shaped with the help of heat and the application of pressure to yield a shaped semi-finished product. The semi-finished product is then subjected to a first firing in a furnace at a temperature such as to cause carbonization or pyrolysis of the resin.

Through the effect of this firing the semi-finished product acquires some porosity because of the loss of volatile material at the carbonization or pyrolysis temperatures. Subsequently the baked semi-finished product is subjected to a second firing in the presence of silicon at a temperature such as to cause melting of the silicon and infiltration into the pores of the aforesaid semi-finished product.

Infiltration by silicon makes it possible to increase the cohesion of the bundles of carbon filaments while at the same time the molten silicon partly reacts with the carbon of the semi-finished product under the conditions of the second firing forming silicon carbides which have the effect of improving the cohesion characteristics of the material.

Subsequently the composition of these materials has been improved through the addition of reinforcing fibres in order to prevent any fractures due to thermal and compression stresses from propagating rapidly throughout the structure of the material, bringing about its complete disintegration (patent application EP 1 124 071). The use of disks of shaped composite material comprising reinforcing fibres for disc brakes appreciably reduces the risks to the user.

Subsequently these composite ceramic materials were further improved by coating them with a layer of silicates, carbides, silicon nitrides or pure silicon. In this way surface oxidation phenomena on the material with a consequent loss of carbon and the formation of surface cavities, which give rise to a change in the system's braking characteristics over time and therefore a reduction in the performance in the vehicle to which these are fitted (international application WO 03/056206) are avoided. Using the composite material known in the art braking systems having the following advantages are obtained:

resistance to high temperatures and compression stresses, thanks to the presence of the reinforcing fibres in the composition of the material, the propagation of fractures throughout the structure and therefore complete disintegration is avoided, the system's braking characteristics, including the friction coefficient, remain virtually unchanged because of the application of a surface coating which protects the material from oxidation.

Notwithstanding the excellent characteristics of this composite material, it can be used to produce a braking system having a specific friction coefficient which cannot easily be changed according to the type of vehicle and braking performance requirements. In fact, in order to be able to vary the friction coefficient it would be necessary to modify the composition of the disk and/or pad material. However such a modification of the material of the braking system could, in addition to being costly, have a major impact on the mechanical properties of the material itself, which might be subject to cracking, splitting or other serious structural defects.

It is known that different types of vehicles have different braking performance requirements depending upon the use for which they are intended. For example competition motor vehicles require performance differing from that of motor vehicles in ordinary use and therefore, as far as braking is concerned, they also require different friction coefficients.

It would therefore be very convenient to be able to select a specific friction coefficient for each type of transport means (for example competition, sporting, tourist vehicles, etc.) and for this to remain substantially constant over time.

SUMMARY OF THE INVENTION

The technical problem addressed by this invention is therefore that of providing a braking system for motor vehicles characterized by a friction coefficient which is predetermined on the basis of the type of vehicle to which it will be applied and in which the said friction coefficient remains substantially constant over time.

It has been shown that it is possible to modulate the friction coefficient of the braking system by acting on the nature of the surface layer of the disk, maintaining the composition of the base layer of the disk and that of the material of the pads unchanged. Surprisingly it has been found that using a composition for the surface layer comprising filaments essentially consisting of carbon, resin and SiC and suitably varying the percentages of the components and other parameters, such as the length of the carbon filaments and the particle size of the SiC after silication, a friction surface having the desired friction coefficient is obtained. Furthermore the latter remains substantially constant over time as a result of the negligible oxidation to which the ceramic material is subject.

In the known art (WO 03/056206) the compound SiC was formed in situ during treatment of the composite material with silicon (silication), as a result of the reaction between part of the carbon present in the filaments, which essentially consist of carbon, and silicon.

In this case on the other hand the SiC is one of the starting materials comprised in the mixture for the surface layer.

Three phases form during the silication phase —C, Si and SiC—the latter comprising both the starting SiC and that forming in situ through reaction between the carbon of the filaments and silicon. The points where the three phases interact will hereinafter be referred to as "C—Si—SiC interfaces". It is clear that by varying the initial percentage of filaments, SiC and resins, friction surfaces with a high or low number or total absence of C—Si—SiC interfaces is obtained, and that these respectively determine whether the friction is high, medium or low. The length of the filaments, essentially consisting of carbon and the particle size of the SiC also influence the type of friction. High friction values correspond to high values of these two parameters, and vice versa.

Therefore by simultaneously varying the three parameters, that is the composition of the surface layer, the length of the filaments and the particle size of the SiC, a friction surface having the desired friction value can be obtained after silication.

DETAILED DESCRIPTION OF THE INVENTION

This invention relates to a composite ceramic material comprising a base layer and at least one surface layer corresponding to at least one of the surfaces of the said base layer, the said base layer comprising filaments essentially consisting of carbon, binders, additives and possibly reinforcing fibres, characterized in that in the said surface layer the percentage composition of the said filaments, resins and SiC, the length of the said filaments and the particle size of the SiC vary in relation to the friction coefficient which it is desired to obtain, which can be achieved using the manufacturing process described below.

By the term "filaments essentially consisting of carbon" are meant fibrous materials obtained by the pyrolysis of various products of synthetic origin, for example polyacrylonitrile (PAN) and polysilazane, or of natural origin, for example pitch, plant fibres and wood.

The said filaments essentially consisting of carbon are normally obtained from bundles of filaments comprising sets of filaments varying from 3000 to 50000 units and having a diameter of between 2 and 8 μm, associated together and impregnated with resin, for example a polyurethane resin.

As far as the base layer is concerned, these bundles are broken up so as to have a length of less than 30 mm, preferably between 7 and 10 mm, typically approximately 8 mm and finally are randomly arranged within the mixture.

The bundles of filaments are commonly defined on the basis of the number of units constituting the bundle, for example 3K, 10K, 50K, 480K correspond to 3000, 10000, 50000 and 480,000 units respectively, and so on.

These preferably have a diameter of 0.1 to 2 mm, more preferably 0.3 to 0.5 mm.

The said binders are selected from: phenolic and acrylic resins, paraffin, pitch, polystyrenes, etc. Preferably the binder is selected from: pitch and phenolic resins.

The said additives are particles of inorganic materials such as preferably graphite powder, silicon carbide, or metal carbides and nitrides.

The composite ceramic material according to the invention may also comprise reinforcing fibres extending within the structure of the material, preferably over its entire shape. The material of the reinforcing fibres preferably comprises carbon fibres. Other materials such as SiC, $Si_3N_4$, TiC, and metals, for example platinum, which are capable of withstanding the temperatures of the interaction with silicon, may however be used. The reinforcing fibres may be incorporated in the material according to the invention in various ways. For example, the reinforcing fibres may be ordered into a plurality of bundles which are positioned in predetermined directions. These directions may be warp and weft directions, the said bundles forming a fabric.

Alternatively, the reinforcing fibres may comprise a non-woven fabric, for example a felt.

The base layer includes the components defined above in the following quantities: filaments essentially consisting of carbon 40-70%, preferably 50-60%, binder 5-30%, preferably 15-25%, additives 0.5-20%, preferably 1-15% and reinforcing fibres 0-30%. All these percentages are understood to be volumes per volume of mixture.

The said at least one surface layer comprises: SiC, filaments essentially consisting of carbon and resins in different percentages. These resins are preferably polyurethane resins. Optionally the said surface layer may also comprise a binder, reinforcing fibres and additives. The latter are as described in the case of the base layer. In a preferred embodiment of the invention the said surface layer is a felt. By felt is meant a non-woven fabric, that is a material in which the filaments essentially consisting of carbon are not arranged in predetermined directions (for example warp and weft), but bind together forming a compact mass through the mechanical action of compression. Felt has the very important properties of uniformity at all points, and ease of insertion into a mould.

The technical problem of this invention is resolved as mentioned above by simultaneously varying both the composition of the said at least one surface layer and the length of the said filaments and the particle size of the SiC in relation to the friction coefficient which it is desired to obtain: high, medium or low. At the same time a material which is not subject to substantial oxidation and which therefore maintains its friction coefficient constant over time is obtained.

By high, medium or low friction are meant friction between 0.4 and 0.7, between 0.3 and 0.5 and between 0.2 and 0.4 respectively.

Table 1 below shows the percentages by weight of filaments essentially consisting of carbon, SiC and resin which it is necessary to use in order to obtain a friction surface having the desired friction coefficient (high, medium or low) after the surface layer has been treated with silicon.

TABLE 1

| Friction surface | Friction coefficient ($\mu$) | Filaments (%) | SiC (%)* | Resin (%) |
|---|---|---|---|---|
| A | High (0.4-0.7) | 25-60 preferably 30-40 | 1-10 preferably 2-7 | 40-75 preferably 50-65 |
| B | Medium (0.3-0.5) | 10-25 preferably 10-20 | 10-15 preferably 11-13 | 60-80 preferably 65-75 |
| C | Low (0.2-0.4) | 5-10 preferably 6-8 | 15-30 preferably 18-25 | 40-70 preferably 50-65 |

Percentage quantity of powdered SiC added to the initial mixture.

After silication of disk friction surfaces A, B, C are therefore obtained according to the starting composition of the surface layer.

Surface A comprises Si, SiC and carbon fibres (in a quantity of 20-40%, preferably 25-30%); the high friction coefficient is due to the very large number of C—Si—SiC interfaces.

Surface B comprises Si, SiC and carbon fibres (in a quantity of 10-20%, preferably 15-19%); the medium friction coefficient is due to a small number of C—Si—SiC interfaces.

Surface C comprises only Si and SiC; the low friction coefficient is due to the absence of C—Si—SiC interfaces, only Si—SiC interfaces being present.

Tables 2 and 3 below show the length ranges of the filaments and SiC particle size which in combination with suitable composition values make it possible to obtain the desired friction surface after silication.

TABLE 2

Variation in filament lengths.

| Friction (μ) | Filaments (mm) |
|---|---|
| High (0.4-0.7) | 5-8 |
| | preferably 6-7 |
| Medium (0.3-0.5) | 1-5 |
| | preferably 2-4 |
| Low (0.2-0.4) | 0.1-1 |
| | preferably 0.2-0.8 |

TABLE 3

Variation in SiC particle size

| Friction (μ) | SiC (mm) |
|---|---|
| High (0.4-0.7) | 1-2 |
| | preferably 1.2-1.7 |
| Medium (0.3-0.5) | 0.1-1 |
| | preferably 0.2-0.8 |
| Low (0.2-0.4) | 0.01-0.1 |
| | preferably 0.02-0.09 |

The variation in SiC particle size is obtained by carrying out granulation for a longer or shorter time. Long granulation times produce SiC with a smaller particle size, while granulation for a shorter time provides SiC with particles of larger dimensions.

Modulation of the friction coefficient is obtained by combining the properties described in Tables 1, 2 and 3. For example, a low friction coefficient will be obtained with a mixture of composition C (Table 1) containing filaments of length between 0.1 and 1 mm and SiC having a particle size of between 0.01 and 0.1 mm.

A larger quantity of SiC in the mixture for the surface layer will encourage reaction between the carbon of the filaments and silicon to yield SiC. This will mean that the carbon phase is absent, and that therefore C—Si—SiC interfaces are absent, and as a consequence friction will be low. The use of longer filaments essentially consisting of carbon will slow down the reaction between the carbon of the filaments and silicon, resulting in the formation of a larger number of C—Si—SiC interfaces and therefore higher friction. The use of a smaller SiC particle size will encourage reaction between the C of the filaments and Si, and therefore the number of C—Si—SiC interfaces will be virtually equal to zero. As a consequence friction will be low because the Si—SiC interfaces produce less friction than the C—Si—SiC interfaces.

The thickness of the said at least one surface layer with reference to the finished disk is preferably between 0.3 and 2 mm, more preferably between 0.7 and 1.5 mm, and even more preferably approximately 1 mm.

The thickness of the base layer instead depends on the type of application and the disk diameter and purely by way of example will lie between 24 and 30 mm for high performance vehicles.

The characteristic feature of the material according to this invention is the fact that the said base layer passes into the said at least one surface layer without any break in continuity or, in other words, there is no sharp demarcation line between the layers. In this way no weak points or surfaces are generated within the disk. Also, the coexistence of the base layer, which determines the structural properties of the disk, and the surface layer, which instead modulates the friction coefficient of the system, makes it possible to achieve the objects of this invention without thereby penalising structural characteristics.

In accordance with a preferred embodiment of this invention, the said at least one surface layer coats the two faces of the said base layer of material as a sandwich.

The composite shaped material according to this invention may be produced through a process similar to that described in the cited published patent applications EP 1 124 071 and WO 03/056206 varying the composition of the surface layer, the length of the filaments essentially consisting of carbon and the particle size of the SiC as described above. This process comprises the steps of:

preparing a first mixture containing a predetermined quantity of filaments essentially consisting of carbon having a length of not more than 30 mm, and a predetermined quantity of a chemical binder, preparing a second mixture comprising filaments essentially consisting of carbon, SiC and resin in variable quantities depending upon the friction coefficient which it is desired to obtain, optionally incorporating a plurality of reinforcing fibres into the said first mixture of the said base layer which extend along the said shape in such a way as to hinder the propagation of cracks, placing the said first mixture and the said second mixture in a mould having the shape of the manufactured article which is to be obtained, in such a way that the said first mixture forms a base layer and the said second mixture forms at least one surface layer on at least one of the two sides of the said base layer, shaping the said first and the said second mixture in the said mould obtaining a semi-finished product, subjecting the said semi-finished product to a first firing at a temperature such as to substantially bring about carbonization or pyrolysis of the said chemical binder, subjecting the fired semi-finished product to a second firing in the presence of silicon at a temperature such as to bring about fusion of the said silicon and infiltration of the same into the said semi-finished product obtaining the said shaped composite material in which the friction coefficient is high, medium or low and remains substantially constant over time.

Optionally the mixture obtained in paragraph b) may be inserted into a mould alone and then hot premoulded at a temperature of 50 to 90° C., preferably from 60 to 75° C., depending upon the type of resin used. In this way the resin does not harden completely but is pre-polymerized (step b1)). Subsequently the premoulded layer is inserted into the mould having the shape of the manufactured article which it is desired to obtain, together with the mixture for base layer a) (step c)) and treated in accordance with paragraphs d), e), f) and g).

The pre-moulded surface layer obtained in step b1) may be subjected to pre-pyrolysis in accordance with the means specified in step f). In this way a porous felt which is ready for insertion into the mould having the shape of the manufactured article which it is desired to obtain is obtained (step c)). In the latter case the base layer mixture is also pyrolyzed before step c) and subsequent step f) is dispensed with.

Advantageously the filaments and/or the reinforcing fibres in the base layer mixture and the said filaments in the surface layer may be coated with a protective resin, preferably polyurethane, before being used in accordance with the process according to the invention.

Alternatively, the said filaments and/or reinforcing fibres may be first coated with the same chemical binder as is used for preparation of the mixture. In this way greater cohesion of the material and a more compact product is obtained.

During the first firing of the semi-finished product the resin and the chemical binder carbonize creating a protective layer on the bundles of filaments and reinforcing fibres, preventing possible disaggregation or even dissolution in the subsequent treatment with silicon. In this way the filament bundles and any reinforcing fibres maintain their original shape throughout the process thus providing a material with good cohesion and strength characteristics.

The binder is preferably added to the mixture in the solid state. For example phenolic resin may be added in the form of pellets, powder or granules.

The mixture may also contain other conventional additives used as fillers or for the purpose of controlling the porosity and density of the desired composite material.

Mixing may be performed in a conventional manner in conventional equipment and the aforesaid filaments will be randomly located in various directions.

The reinforcing fibres may be incorporated in the mixture in different ways. One example of a process is that described in published application EP 1 124 071, the description of which in that respect is incorporated here for reference.

The quantity of reinforcing fibres incorporated into the mixture depends on the desired fibre content of the final composite material, the said content lying within the range 0-30% by volume per volume of material.

During the shaping step of the process according to the invention (step e)), the said first and second mixtures are heated in the mould to a temperature of 80° C. to 180° C., preferably 100-120° C., and a pressure of between 0.1 N/cm$^2$ and 5 N/cm$^2$, preferably 0.5-1 N/cm$^2$, is applied to them.

The compact shaped semi-finished product so obtained is removed from the mould and then subjected to a first firing to carbonize the chemical binder (step f, pyrolysis).

This firing is performed in a conventional furnace at a temperature which substantially depends on the type of binder used and which generally lies within the range 900-1200° C.

Firing is carried out in the presence of a flow of inert gas such as nitrogen or argon, and with an excess pressure of 10-100 mbar, preferably 20-30 mbar. The aforesaid flow also advantageously makes it possible to remove the gases which are released from the chemical binder by the pyrolysis.

During this step of the process the semi-finished product acquires greater porosity, which is important in the subsequent firing because it allows the fused silicon to infiltrate within it.

The operating conditions for step f) are the same as those applied in step b1), that is in the case in which the surface layer is premoulded.

In accordance with one embodiment of the invention the process may further comprise a step of finishing the surface of the semi-finished product originating from the first firing in step f). This advantageously makes it possible to remove any surface deformation of the semi-finished product using conventional equipment so as to provide it with the desired shape.

The finishing operation is preferably performed dry, for example using diamond.

The semi-finished product fired in accordance with step f) is subjected to a second firing in the presence of silicon (step g)).

In order to perform the second firing, the fired semi-finished product which may have been subjected to finishing is placed in the chamber of a container having a volume of approximately twice the volume of the semi-finished product, the space formed between the semi-finished product and the container being filled with silicon, which surrounds the semi-finished product. The quantity of silicon used is therefore that required to fill the porosities in the semi-finished product, or a little more.

Pure silicon, and/or an alloy of silicon and aluminium or copper, as grains or powder, is used to fill the aforesaid gap.

The chamber may be in communication with the outside through suitable holes which allow the gases released during firing to escape.

After the silicon has been loaded the container is inserted into a suitable furnace and heated to a temperature of 1400-1700° C. At the said temperatures the silicon melts and infiltrates into the pores of the semi-finished product (silication step).

Firing is performed under vacuum, reducing pressure from atmospheric (980 mbar) to 1 mbar, preferably to 1.5 mbar.

When firing is complete the composite material is cooled for example using argon or, preferably, nitrogen, so that the residual silicon solidifies into small spheres which are easy to recover from the container.

The composite material according to the invention obtained in this way may be subjected to finishing operations, for example surface finishing, which may be carried out dry or wet in a conventional way.

It is obvious that the steps of firing in a furnace, that is pyrolysis and silication, may be carried out in a single furnace, reducing times and the complexity of the production equipment.

The composite material according to the invention may be shaped in various shapes depending upon the final use. In particular the material according to the invention may be advantageously used in the manufacture of brake components for vehicles, in particular disc brakes.

In this application the aforesaid material may be shaped into a braking ring or band for disks to form the braking component of the disc brake. So-called ventilated disks, such as those described in international applications nos. PCT/IT00/00543 of the 22.12.2000, PCT/IT01/00412 of the 27.07.2001 and PCT/IT 01/00411 of the 27.07.2001 in the name of the same applicant as for this patent application may also be constructed using the composite material according to the invention.

ADVANTAGES

The fact that the friction coefficient can be selected in relation to the type of braking performance required makes it possible to manufacture vehicles which are personalized to the purchaser's requirements. For example racing cars require very high friction coefficients in order to ensure user safety.

Because the friction coefficient depends on the material of the disk and the pads, at the present time it is necessary to modify the composition of the latter components in order to obtain different coefficients.

This invention provides a braking system in which the friction coefficient can be varied easily and economically. In fact only the composition of the surface layer is modified in relation to the desired friction and this brings about a substantial reduction in costs and an increase in the rate of manufacture.

The features and advantages of this invention will be more apparent from the following description of an example preparation of a shaped composite material according to the invention, the said description being provided by way of indication and without restriction.

EXAMPLE

A first mixture containing, as percentages by volume per volume of mixture, 65% of carbon filaments having a diameter from 0.3 mm to 0.5 mm and a length of 7 mm to 10 mm, 23% of dry phenolic resin and 12% of silicon carbide powder was prepared in a mixer, known as an Erigh mixer, in a conventional way.

A second mixture containing, as percentages by volume per volume of the mixture, 15% of carbon filaments having a diameter from 0.3 mm to 0.5 mm and a length of approximately 3 mm, 73% of dry phenolic resin and 12% of silicon carbide powder having a particle size of 0.5 mm was also prepared in the same way.

A portion of the second mixture was then placed in the cavity of an annular mould of inside diameter 150 mm, outside diameter 335 mm and height 102 mm in such a way as to form a layer having a thickness of approximately 1 mm in the finished product.

After its surface had been levelled, a second layer of the first mixture was spread on this layer in a quantity such as to obtain a thickness of approximately 30 mm in the finished product. This surface was also levelled.

A third layer of the second mixture in a quantity such as to form a layer having a thickness of approximately 1 mm in the finished product was deposited on the second base layer in such a way as to form a sandwich configuration.

Subsequently the layers of the first and second mixture were shaped by heating the mould to a temperature of 100° C. and applying a pressure of 1 N/cm², producing a rough body in the form of a disk.

After being removed from the mould the rough disk was subjected to firing in a furnace heated to a temperature of 1100° C. for a residence time of 12 hours.

Firing was carried out at a pressure of 30 mbar and in an atmosphere inerted by the presence of argon, delivered to the furnace with a flow of 30 liters/minute.

After firing, the aforesaid disk was subjected to dry diamond finishing in a conventional way in order to remove surface deformations.

At this point the rough disk was placed in a container provided with holes to permit the escape of gas. The container was filled with grains of silicon in the required quantity to fill the space formed between the disk and the container. The container was then transferred to a furnace heated to a temperature of 1500° C. and caused to remain in that furnace for a period of 8 hours. Firing was carried out at a reduced pressure of 1.5 mbar, and was followed by cooling in the furnace with nitrogen being continually blown at atmospheric pressure.

This yielded a disk of composite material according to the invention which after cooling was subjected to diamond finishing in a conventional way to remove surface deformations and to obtain the final shape with the desired accuracy and tolerances.

Analysis of the surface layer of the disk obtained revealed a friction surface comprised of Si—SiC and carbon fibres in a quantity of 17%, corresponding to a friction of 0.4. The value was determined by a test on a dynamic test bench and in the laboratory using a tribometer.

The disk was tested as a component of a disc brake for vehicles and proved to have excellent hardness, impact resistance, wear, compression and friction-generated temperature-during-braking characteristics. In addition to this the disk in the example was subject to a loss of carbon weight after 1000 braking cycles which was a quarter less in comparison with a disk according to the known art, as well as having a friction coefficient substantially identical to the initial coefficient.

As is clear from the above description the composite material according to the invention has good resistance to oxidation which is reflected in a friction coefficient which is constant over time. Also this composite material makes it possible to select the initial friction coefficient on the basis of the requirements which have to be satisfied (for example: racing car, motor cycle, motor vehicle for ordinary use, etc.).

An optimum friction coefficient for the type of vehicle which is constant over time ensures better reproducibility when braking and therefore improved vehicle reliability.

A person skilled in the art may in order to satisfy specific requirements make many modifications to, adaptations and replacements of elements with other functional equivalents to the preferred embodiment of the composite ceramic material described above without however going beyond the scope of the following claims.

What we claim is:

1. A method of making a shaped composite material comprising a base layer and at least one surface layer and for controlling the coefficient of friction of the surface layer, said method comprising the following steps:
   a) preparing of a first mixture consisting essentially of carbon fibers and chemical binders;
   b) preparing of a second mixture consisting essentially of carbon fibers, powdered SiC particles, and resin, said second mixture being selected from the group consisting of:
      i) 25% to 60% by weight of filaments consisting essentially of carbon having a length of 5 to 8 mm, 1 to 10% by weight of SiC having a particle size from 1 to 2 mm and 40 to 75% by weight of resin in order to obtain a high coefficient of friction,
      ii) 10 to 25% by weight of filaments consisting essentially of carbon having a length of 1 to 5 mm, 10 to 15% by weight of SiC having a particle size from 0.1 to 1 mm, and 60 to 80% by weight of resin in order to obtain a medium coefficient of friction, and
      iii) 5 to 10% by weight of filaments consisting essentially of carbon having a length of 0.1 to 1 mm, 15 to 30% by weight of SiC having a particle size of 0.01 to 0.1 mm, and 40 to 70% by weight of resin in order to obtain a low coefficient of friction;
   c) placing said first mixture and said second mixture in a mold having the shape of the composite product, wherein said first mixture constitutes said base layer and said second mixture constitutes said at least one surface layer, and then molding the two mixtures together with the application of heat and pressure to obtain a semi-finished product;
   d) firing said semi-finished product at a first temperature in the range of 900° C. to 1200° C. sufficient to bring about carbonization or pyrolysis of said chemical binder; and
   e) after step d), firing said product in the presence of silicon at a temperature of 1400° C. to 1700° C. sufficient to cause the silicon to melt and infiltrate into the semi-finished product to obtain a finished product,
   wherein step b) includes a step of adjusting the quantity of SiC particles and the coefficient of friction by either increasing said quantity to decrease the coefficient of friction, or decreasing said quantity to increase the coefficient of friction.

2. The process according to claim 1 in which in step b) said mixture comprises from 30 to 40% by weight of filaments consisting essentially of carbon having a length from 6 to 7 mm, from 2 to 7% by weight of SiC having a particle size from 1.2 to 1.7 mm and from 50 to 65% by weight of resin in order to obtain a high friction coefficient.

3. The process according to claim 1 in which in step b) said mixture comprises from 10 to 20% by weight of filaments consisting essentially of carbon having a length from 2 to 4 mm, from 11 to 13% by weight of SiC having a particle size from 0.2 to 0.8 mm and from 65 to 75% by weight of resin in order to obtain a medium friction coefficient.

4. The process according to claim 1 in which in step b) said mixture comprises from 6 to 8% by weight of filaments consisting essentially of carbon having a length from 0.2 to 0.8 mm, from 18 to 25% by weight of SiC having a particle size from 0.02 to 0.09 mm and from 50 to 65% by weight of resin in order to obtain a low friction coefficient.

5. The process according to claim 1 in which the resin used in step b) is a polyurethane.

6. The process according to claim 1 in which said first mixture further comprises reinforcing fibres and/or additives.

7. The process according to claim 1 in which in step a) said first mixture comprises filaments consisting essentially of carbon having a length of less than 30 mm.

8. The process according to claim 1 in which in step a) said first mixture comprises filaments consisting essentially of carbon from 40 to 70% v/v.

9. The process according to claim 1 in which in step a) said first mixture comprises chemical binders from 5 to 30% v/v.

10. The process according to claim 1 in which in step a) said first mixture comprises additives from 0.5 to 20% v/v.

11. The process according to claim 1 in which in step a) said first mixture comprises a plurality of reinforcing fibres.

12. The process according to claim 11 in which said reinforcing fibres are in a quantity from 0 to 30% v/v.

13. The process according to claim 1 in which said step c) is carried out at a temperature from 80 to 180° C.

14. The process according to claim 1 in which said step c) is carried out at a pressure from 0.1 N/cm$^2$ to 5 N/cm$^2$.

15. The process according to claim 1 in which said step d) is carried out in the presence of a flow of inert gas at a pressure of 10-100 mbar.

16. The process according to claim 1 in which the semi-finished product from step d) is subjected to a surface finishing step.

17. The process according to claim 1 in which in said step e) the silicon used is pure silicon and/or an alloy of silicon and aluminum or copper.

18. The process according to claim 1 in which said step e) is carried out at a pressure of approximately 1 mbar.

19. The process according to claim 1 in which said second mixture b) is hot premolded at a temperature of 50 to 90° C.

* * * * *

UNITED STATES PATENT AND TRADEMARK OFFICE
CERTIFICATE OF CORRECTION

PATENT NO. : 8,349,231 B2
APPLICATION NO. : 11/722824
DATED : January 8, 2013
INVENTOR(S) : Goller et al.

It is certified that error appears in the above-identified patent and that said Letters Patent is hereby corrected as shown below:

Title Page:

Change:

Item (73)   Assignee: -- Brembo Ceramic Brake Systems S.p.A.
                      Stezzano, Bergamo (IT) -- to:

Item (73)   Assignee: "Freni Brembo S.p.A.
                      Curno, Bergamo (IT)"

Signed and Sealed this
Fourth Day of June, 2013

Teresa Stanek Rea
*Acting Director of the United States Patent and Trademark Office*